(12) United States Patent
Gao et al.

(10) Patent No.: US 11,075,811 B2
(45) Date of Patent: Jul. 27, 2021

(54) METHOD AND APPARATUS FOR DEVICE IDENTIFICATION

(71) Applicant: Beijing Xiaomi Mobile Software Co., Ltd., Beijing (CN)

(72) Inventors: Sitai Gao, Beijing (CN); Yangpeng Lv, Beijing (CN); Minghuan Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 242 days.

(21) Appl. No.: 15/484,304

(22) Filed: Apr. 11, 2017

(65) Prior Publication Data

US 2018/0062934 A1    Mar. 1, 2018

(30) Foreign Application Priority Data

Aug. 30, 2016 (CN) .......................... 201610787081.3

(51) Int. Cl.
*G06F 15/16* (2006.01)
*H04L 12/24* (2006.01)
*H04L 12/28* (2006.01)

(52) U.S. Cl.
CPC .......... *H04L 41/12* (2013.01); *H04L 12/2809* (2013.01); *H04L 41/0809* (2013.01); *H04L 41/0893* (2013.01); *H04L 41/22* (2013.01)

(58) Field of Classification Search
CPC ..................................................... H04L 41/12
See application file for complete search history.

(56) References Cited

U.S. PATENT DOCUMENTS

| 8,214,494 | B1 | 7/2012 | Slavin | |
| 8,837,360 | B1 * | 9/2014 | Mishra | ..................... H04L 41/12 370/328 |
| 8,880,664 | B1 * | 11/2014 | Tekle | ..................... H04L 41/22 709/223 |
| 9,661,120 | B1 * | 5/2017 | Skeffington | ......... H04L 12/2827 |
| 2008/0301266 | A1 * | 12/2008 | Savkar | ................ H04L 41/0803 709/220 |

(Continued)

FOREIGN PATENT DOCUMENTS

| CN | 1889538 A | 1/2007 |
| CN | 104506360 A | 4/2015 |

(Continued)

OTHER PUBLICATIONS

International Search Report issued in International Patent Application No. PCT/CN2016/107683, mailed from the State Intellectual Property Office of China dated Jun. 1, 2017.

(Continued)

*Primary Examiner* — Kevin T Bates
*Assistant Examiner* — Clarence D McCray
(74) *Attorney, Agent, or Firm* — Finnegan, Henderson, Farabow, Garrett & Dunner, L.L.P.

(57) ABSTRACT

The present disclosure relates to a method for device identification. The method includes obtaining a network class identification of a network device. The network device establishes a network, and the network class identification indicates a network coverage location of the network established by the network device. The method further includes generating a location identification for a smart device according to the network class identification, and displaying the location identification for the smart device in a smart device list. The smart device is connected to the network.

9 Claims, 4 Drawing Sheets

(56) References Cited

U.S. PATENT DOCUMENTS

| | | | |
|---|---|---|---|
| 2011/0038283 A1 | 2/2011 | Yu et al. | |
| 2012/0008526 A1* | 1/2012 | Borghei | H04W 4/021 370/254 |
| 2013/0103419 A1* | 4/2013 | Beaudry | G16H 10/40 705/3 |
| 2013/0124309 A1* | 5/2013 | Traasdahl | G06Q 30/0251 705/14.49 |
| 2015/0067163 A1* | 3/2015 | Bahnsen | H04W 4/02 709/225 |
| 2015/0177948 A1* | 6/2015 | Sasaki | G06F 3/04817 715/740 |
| 2015/0242066 A1* | 8/2015 | Chen | G06F 3/0481 715/738 |
| 2016/0080465 A1* | 3/2016 | Sasaki | G06F 3/04817 715/740 |
| 2016/0156682 A1* | 6/2016 | Jeon | G06F 1/163 709/204 |
| 2017/0359189 A1* | 12/2017 | Smith | G06F 3/0482 |

FOREIGN PATENT DOCUMENTS

| | | |
|---|---|---|
| CN | 104601694 A | 5/2015 |
| CN | 105100231 A | 11/2015 |
| CN | 105607499 A | 5/2016 |
| CN | 105739468 A | 7/2016 |
| CN | 205484772 U | 8/2016 |
| JP | 2005-130307 A | 5/2005 |
| JP | 2013134516 A | 7/2013 |
| JP | 2014075783 A | 4/2014 |
| RU | 2332680 C2 | 8/2008 |
| RU | 2441270 C2 | 1/2012 |
| WO | WO 2015/165317 A1 | 11/2015 |

OTHER PUBLICATIONS

European Search Report issued in Application No. 17160673.4, mailed from the European Patent Office, dated Oct. 4, 2017.

* cited by examiner

METHOD AND APPARATUS FOR DEVICE IDENTIFICATION

CROSS-REFERENCE TO RELATED APPLICATION

The present application is based upon and claims priority to Chinese Patent Application No. 201610787081.3, filed on Aug. 30, 2016, the entire contents of which are incorporated herein by reference.

TECHNICAL FIELD

The present disclosure generally relates to the technical field of smart device, and more particularly, to a method and apparatus for device identification.

BACKGROUND

With emergence of more and more smart devices, management of smart devices has become a problem. In order to facilitate management, users usually divide smart devices into different groups manually, and each smart device is added to a created group. When it is needed to control a certain smart device, a user may first determine a group to which the smart device belongs. Alternatively, a user may manually tag smart devices, and then determine a smart device to be controlled according to a tag. However, these solutions require users to manually divide smart devices into different groups or tag smart devices. Further, if reorganization is needed, previous groups and tags need to be withdrawn, and users need to manually divide the smart devices into different groups or tag the smart devices again. This causes inconvenience to users, and groups and tags cannot be updated automatically.

The method and apparatus of the present disclosure are directed towards overcoming one or more the problems set forth above.

SUMMARY

According to a first aspect of embodiments of the present disclosure, there is provided a method for device identification. The method includes obtaining a network class identification of a network device. The network device establishes a network, and the network class identification indicates a network coverage location of the network established by the network device. The method further includes generating a location identification for a smart device according to the network class identification, and displaying the location identification for the smart device in a smart device list. The smart device is connected to the network.

According to a second aspect of embodiments of the present disclosure, there is provided an apparatus for device identification. The apparatus includes a processor and a memory for storing instructions executable by the processor. The processor is configured to obtain network class identifications of one or more network devices each of which establishes a network. A network class identification indicates a network coverage location of the network established by each network device. The processor is further configured to generate a location identification for a smart device according to the network class identification, and to display the location identification for the smart device in a smart device list. The smart device is connected to the network.

According to a third aspect of embodiments of the present disclosure, there is provided a non-transitory computer-readable storage medium having stored therein instructions that, when executed by a processor of a terminal device, cause the terminal device to perform a method for device identification. The method includes obtaining network class identifications of one or more network devices each of which establishes a network. A network class identification indicates a network coverage location of the network established by each network device. The method further includes generating a location identification for a smart device according to the network class identification, and displaying the location identification for the smart device in a smart device list. The smart device is connected to the network.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely exemplary devices and methods consistent with aspects related to the present disclosure as recited in the appended claims.

Figure 1:
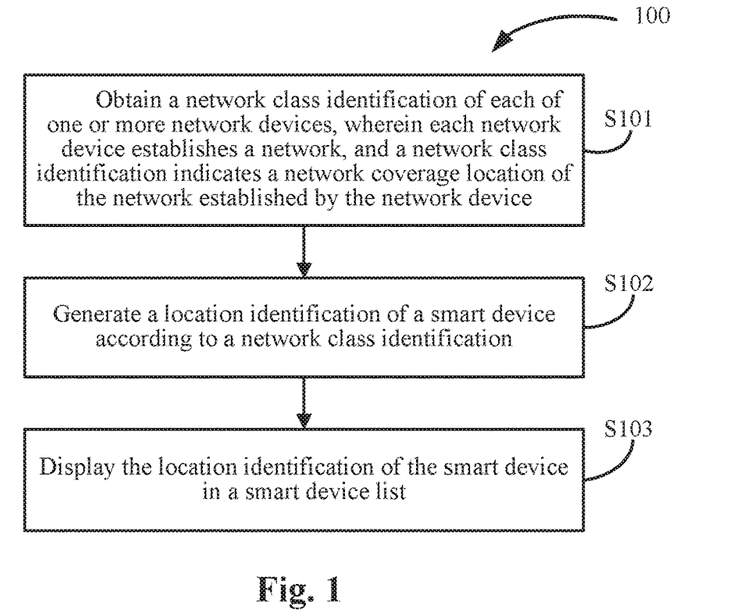
FIG. 1 is a flowchart of a method for device identification according to an exemplary embodiment.

In exemplary embodiments of the present disclosure, a method 100 for device identification is provided. The method may be applied in a program, system or apparatus for device identification. The method may be performed by a terminal used to manage smart devices, such as a mobile phone, a tablet or a computer. As shown in FIG. 1, the method 100 may include steps S101 to S103.

In step S101, a network class identification for each of one or more network devices is obtained. Each of the one or more network devices establishes a network. A network class identification indicates a network coverage location of the network established by each network device.

The network may include wired and/or wireless network connections. The wireless network connection may be a Bluetooth network connection, a WiFi network connection, a mobile data network connection, or the like.

The network class identification may indicate a network coverage location of the network established by each network device. For example, if a network established by a network device covers an X building, the network coverage location of the network is the X building. If a network established by a network device covers an X house, the network coverage location of the network is the X house. If a network established by a network device covers an X living room of an X house, the network coverage location of the network is the X living room of the X house.

The one or more network devices may each be a device that is capable of establishing a network, for example, a router, a repeater, a switch, or a mobile phone.

In step S102, a location identification of a smart device is generated according to a network class identification. The smart device is connected to a network established by a network device corresponding to the network class identification.

In step S103, the location identification of the smart device is displayed in a smart device list.

In the exemplary embodiment, each of the one or more network devices establishes a network. After the one or more network class identifications of the one or more network devices are obtained, respectively, a location identification of a smart device is automatically generated according to a network class identification. The smart device is connected to a network corresponding to the network class identification. The location identification of the smart device is displayed in a smart device list. In this way, a user can clearly identify a location of a smart device by viewing a location identification of the smart device in the smart device list. Because users are accustomed to basing on locations of smart devices to search for and/or manage (for example, control) the smart devices within a certain location range, the technical solutions provided in this disclosure can enable users to manage smart devices quickly and conveniently, without manually dividing the smart devices into different groups or tagging the smart devices.

Further, because the location identification of the smart device is generated according to the network class identification, when the location identification of the smart device is displayed in a smart device list, location identifications of smart devices having a same network class identification can be naturally displayed together. And location identifications of smart devices having different network class identifications can be naturally displayed separately. Thus, smart devices can be automatically grouped/classified according to the network class identification.

In some embodiments, prior to step S101 in FIG. 1, the method 100 may further include receiving the network class identification from user input. For example, the network class identification may be entered by a user.

In some embodiments, prior to step S101 in FIG. 1, the method 100 may further include determining the network class identification according to an instruction received for selecting a network coverage location.

When the network coverage location of the network is one of a plurality of optional locations, the network coverage location may be selected from the plurality of optional locations according to an instruction. The instruction is received to indicate a selection for the network coverage location. A network class identification can be automatically determined for the network coverage location selected corresponding to the instruction.

Figure 2:
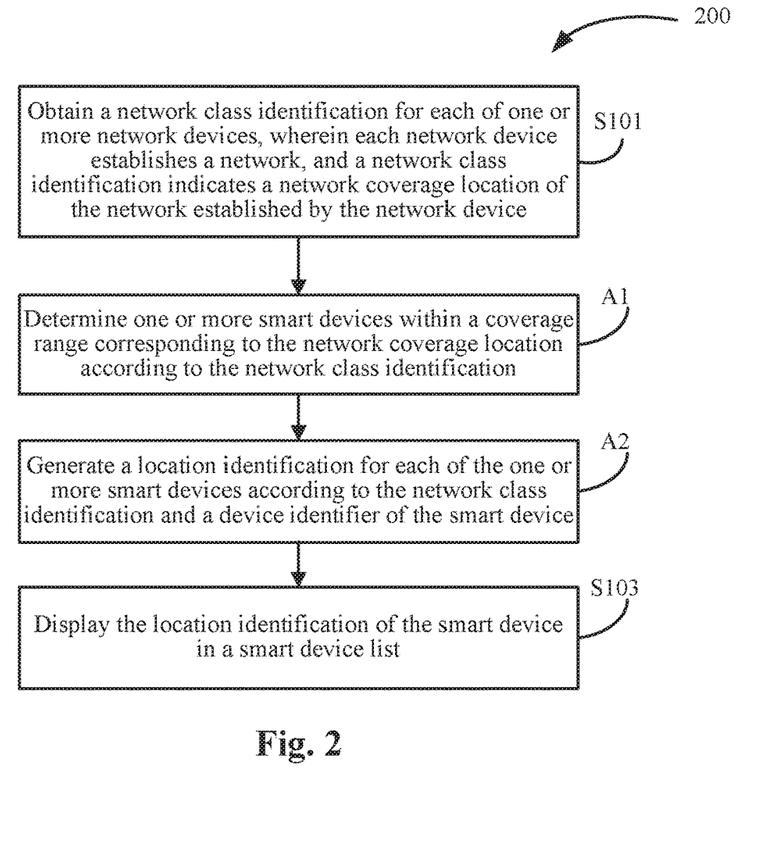
FIG. 2 is a flowchart of a method for device identification according to another exemplary embodiment.

As shown in FIG. 2, a method 200 for device identification is provided according to another exemplary embodiment. In addition to the steps S101 and S103 (FIG. 1), the method 200 may further include the following steps that may be implemented in step S102 in FIG. 1.

In step A1, one or more smart devices within a coverage range corresponding to the network coverage location are determined according to the network class identification. There may be one or more smart devices within the coverage range corresponding to the network coverage location. And the smart devices may be of a same type or different types. If the smart devices within the coverage range corresponding to the network coverage location include a plurality of smart devices of a same type, the plurality of smart devices of the same type may be identified, for example using serial numbers or models.

In step A2, a location identification is generated for each of the one or more smart devices according to the network class identification and a device identifier of each of the one or more smart devices. A device identifier may be information used to identify a smart device, such as a name, a model, or a serial number of the smart device. The smart devices may be devices managed via a network. The smart devices are located within the coverage range corresponding to the network coverage location and are connected to the network. The smart devices include, but are not limited to, smart lights, smart air purifiers, smart washing machines, smart air conditioners, smart refrigerators, and/or mobile phones. In the exemplary embodiment, the location identification of each smart device may be generated by combining the network class identification and the device identifier of the smart device.

For example, after the network class identification is obtained, the smart devices within the coverage range corresponding to the network coverage location, which corresponds to the network class identification, are determined. Location identifications of the smart devices can be automatically generated according to the network class identification and device identifiers of the smart devices. For example, if the network class identification is the second floor of an X house, and the device identifier of a smart device indicates that the smart device is a smart light, the location identification of the smart light may be, for example the second floor of the X house—smart light. If the network class identification is the third floor of an X building and the device identifier of the smart device indicates that the smart device is No. 1 smart air conditioner, the location identification of the No. 1 smart air conditioner may be, for example, the third floor of the X building—No. 1 smart air conditioner. In this way, users do not need to manually tag smart devices. Further, the location identification of a smart device directly indicates a network class identification (i.e., a network coverage location of a network established by a network device). Thus, users can quickly find smart devices located at a certain location according to the differences between the network coverage locations, and manage the smart devices, without manually dividing the smart devices into groups.

Figure 3:
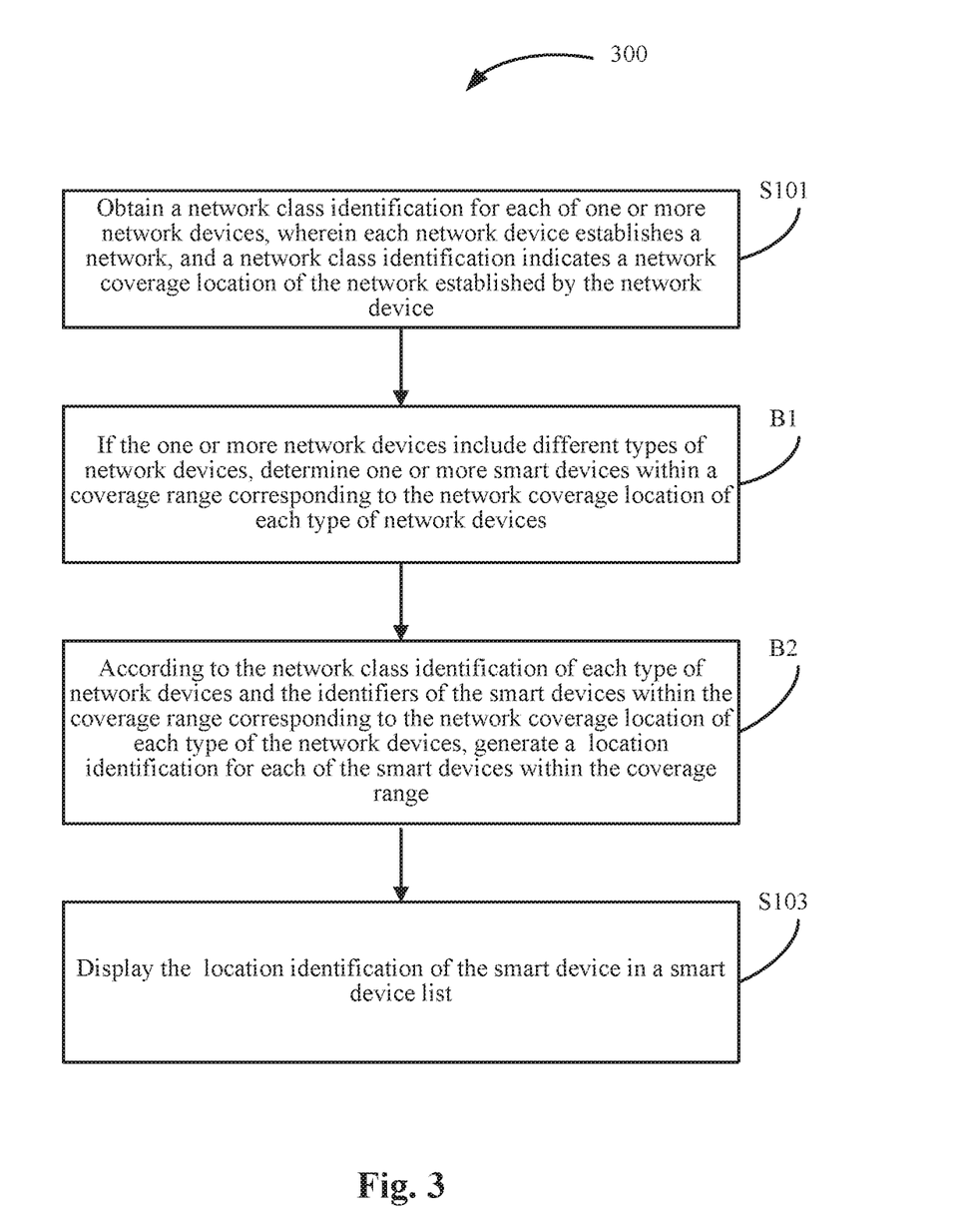
FIG. 3 is a flowchart of a method for device identification according to yet another exemplary embodiment.

As shown in FIG. 3, a method 300 for device identifier is provided according to yet another exemplary embodiment. In addition to the steps S101 and S103 (FIG. 1), the method 300 may further include the following steps that may be implemented in step A1 and A2 in FIG. 2.

Step B1 may be implemented in step A1. In step B1, if the one or more network devices include different types of network devices, one or more smart devices within a coverage range corresponding to the network coverage location of each type of network devices are determined.

Step B2 may be implemented in step A2. In step B2, according to the network class identification of each type of network devices and the identifiers of the smart devices within the coverage range corresponding to the network coverage location of each type of the network devices, the location identifications of the smart devices within the coverage range are generated. There may be one or more smart devices within the network coverage range corresponding to the network coverage location of each type of network devices. Regardless of one or more smart devices, when a location identification is generated for each smart device within the coverage range, the location identification may be generated according to the network class identification of the network device corresponding to the network coverage location where the smart device is located, and an identifier of the smart device.

When there are multiple different types of network devices, one or more smart devices within a coverage range corresponding to the network coverage location of each type of network devices are determined. And according to a network class identification of each type of network devices and identifiers of the smart devices within the coverage range corresponding to the network coverage location of each type of the network devices, location identifications of the smart devices within the coverage range can be generated automatically, so that accurate and comprehensive location identifications can be generated for the smart devices. This can enable users to conveniently find and manage smart devices within a coverage range of a certain network coverage location. Also, in order to further facilitate users to manage smart devices, the location identifications may be generated for the smart devices within the coverage range corresponding to the network coverage location of each type of network devices according to a priority of the network class identification of each type of network devices and the identifiers of the smart devices within the coverage range. For example, the priority may be predetermined, or a higher priority may be applied to a network device covering a larger range. As a result, the network class identification of the type of network devices having a higher priority is given a higher ranking in the location identification of smart device.

For example, there are two types of network devices, i.e., a router and a repeater. The network coverage location of the network established by the router is an X house (i.e., the network class identification of the router is the X house), and the smart devices in the X house include a No. 1 smart light and a No. 2 smart light. The network coverage location of the network established by the repeater is a south bedroom in the X house (i.e., the network class identification of the repeater is the south bedroom of the X house), and the smart device in the south bedroom of the X house is the No. 2 smart light. If the priority of the router is higher than the priority of the repeater, the location identification of the No. 1 smart light may be the X house—the No. 1 smart light, and the location identification of the No. 2 smart light may be the X house—the south bedroom—the No. 2 smart light. That is, in the location identification of the No. 2 smart light, the network class identification of the router which has a higher priority is given a higher ranking than the network class identification of the repeater which has a lower priority).

In some embodiments, the network devices may include one or more of a router, a repeater, or a switch. The network devices may be any device that is capable of establishing a network for smart devices including, for example, a router, a repeater, a switch, or a mobile phone.

Figure 4:
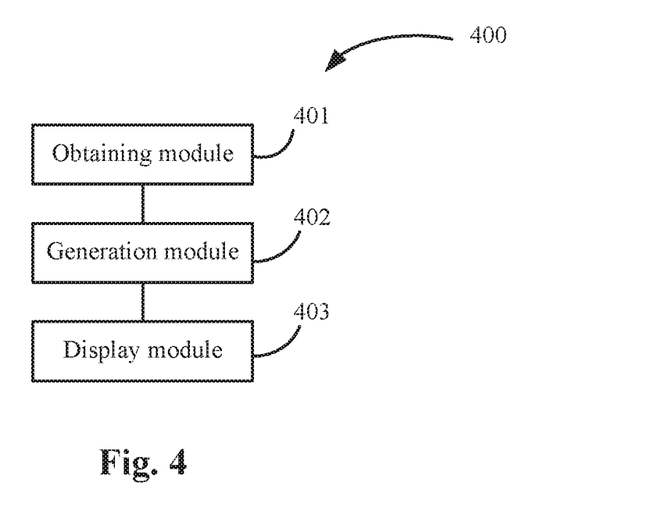
FIG. 4 is a block diagram of an apparatus for device identification according to an exemplary embodiment.

Corresponding to the above methods for device identification, the present disclosure also provides an apparatus 400 for device identification. As shown in FIG. 4, the apparatus 400 may include an obtaining module 401, a generation module 402, and a display module 403.

The obtaining module 401 is configured to obtain one or more network class identifications of one or more network devices, respectively. Each of the one or more network devices establishes a network. The network class identification indicates a network coverage location of the network established by each network device.

The generation module 402 is configured to generate a location identification for a smart device according to the network class identification. The smart device is connected to the network established by a corresponding network device.

The display module 403 is configured to display the location identification of the smart device in a smart device list.

In some embodiments, the apparatus 400 may further include a receiving module and/or a determination module.

The receiving module is configured to, before the network class identifications of the network devices are obtained, receive the network class identifications that are entered.

The determination module is configured to determine the network class identification according to an instruction received for selecting a network coverage location.

Figure 5:
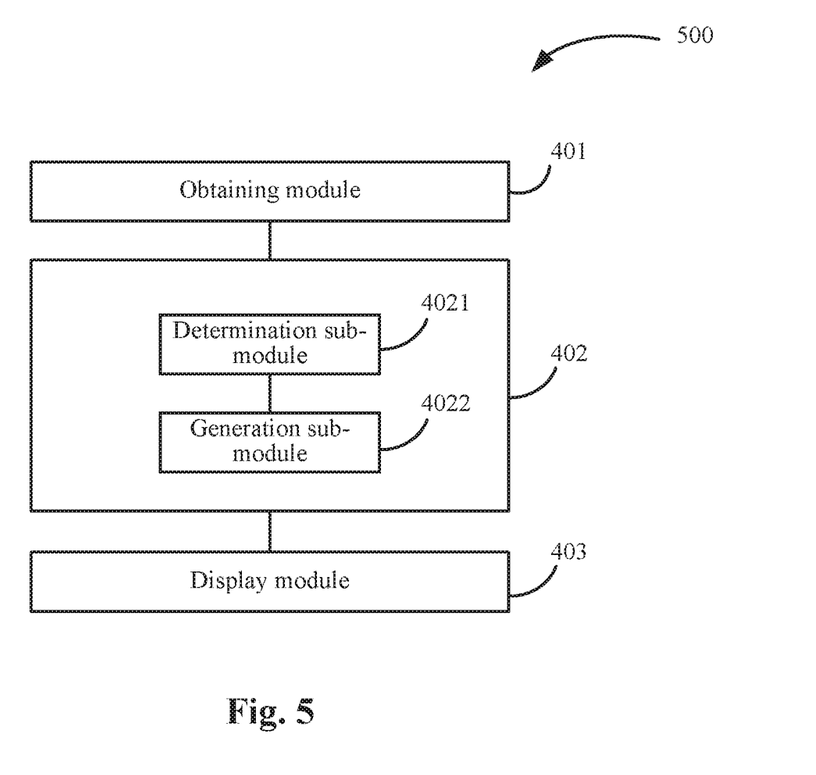
FIG. 5 is a block diagram of an apparatus for device identification according to another exemplary embodiment.

As shown in FIG. 5, an apparatus 500 is provided according to another exemplary embodiment. In the apparatus 500, the generation module 402 as shown in FIG. 4 may include a determination sub-module 4021 and a generation sub-module 4022.

The determination sub-module 4021 is configured to determine one or more smart devices within a coverage range corresponding to a network coverage location, according to a network class identification.

The generation sub-module 4022 is configured to generate location identifications according to the network class identifications and identifiers of the smart devices.

In some embodiments, the determination sub-module 4021 may further include a determination unit configured to, if the network devices include multiple different types of network devices, determine one or more smart devices within the coverage range corresponding to the network coverage location of each type of network devices.

In some embodiments, the generation sub-module 4022 may further include a generation unit configured to, according to the network class identification of each type of network devices and the identifiers of the smart devices within the coverage range corresponding to the network coverage location of each type of the network devices, generate the location identifications of the one or more smart devices within the coverage range.

In some embodiments, the network devices include one or more of a router, a repeater, or a switch.

According to another exemplary embodiment, the present disclosure provides an apparatus for device identification. The apparatus may include a processor and a memory for storing instructions executable by the processor.

The processor is configured to obtain a network class identification for each of one or more network devices, wherein each of the network devices establishes a network, and the network class identification indicates a network coverage location of the network established by each network device; generate a location identification of a smart device according to the network class identification; and display the location identification of the smart device in a smart device list.

The processor may be further configured to receive the network class identification that is entered; and/or to determine the network class identification according to an instruction received for selecting a network coverage location.

The processor may be configured to determine one or more smart devices within a coverage range corresponding to a network coverage location according to the network class identification; and generate the location identifications according to the network class identification and the identifiers of the smart devices.

The processor may be further configured to, if the network devices include multiple different types of network devices, determine one or more smart devices within a coverage range corresponding to the network coverage location of each type of network devices; and according to the network class identification of each type of network devices and the identifiers of the smart devices within the coverage range, generate the location identifications of the smart devices within the coverage range.

The one or more network devices may include one or more of a router, a repeater, or a switch.

Figure 6:
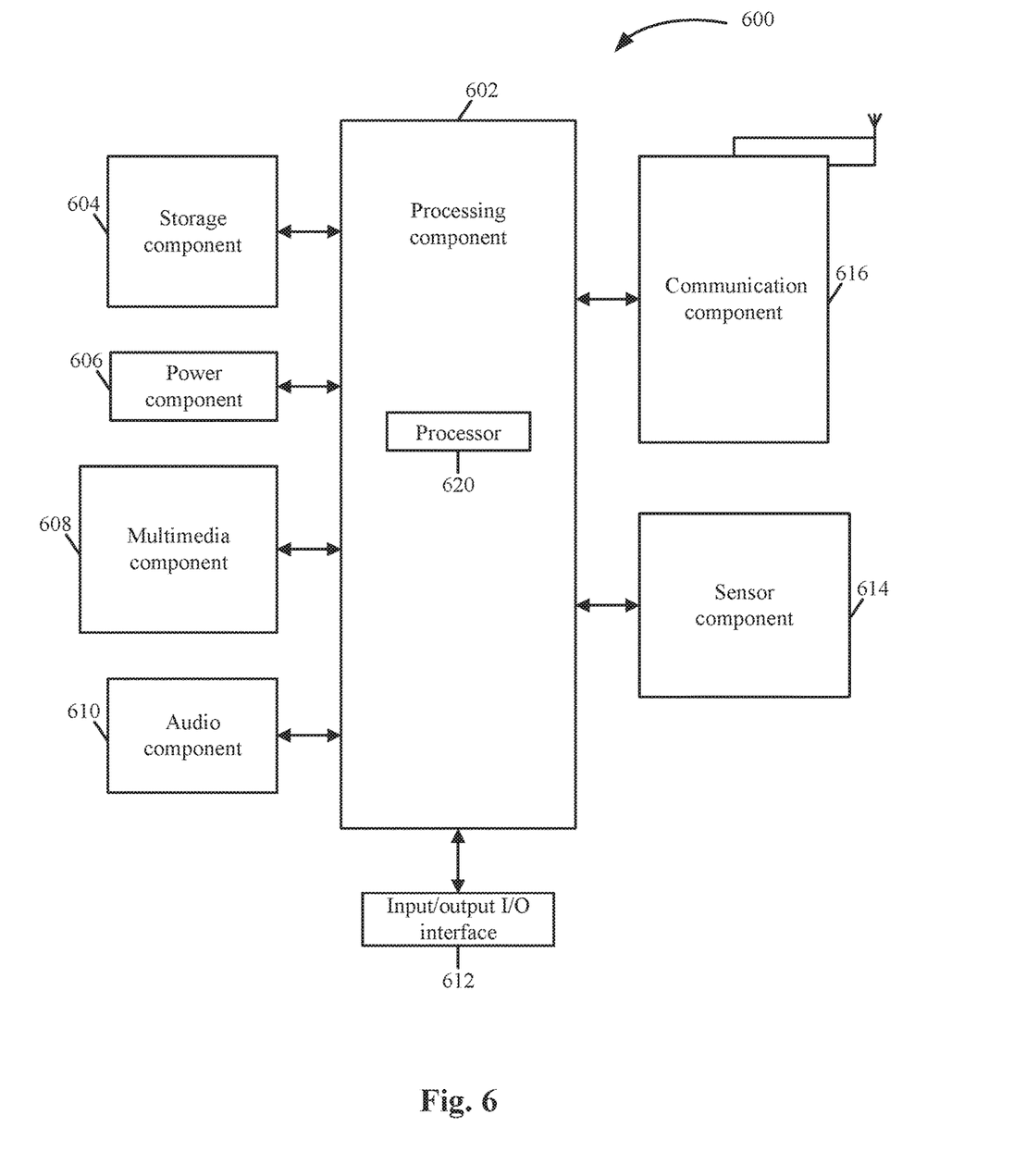
FIG. 6 is a block diagram of an apparatus for device identification according to yet another exemplary embodiment.

FIG. 6 is a block diagram of an apparatus 600 for device identification according to another exemplary embodiment. The apparatus 600 may be applied in a terminal device. For example, the apparatus 600 may be a mobile phone, a computer, a digital broadcast terminal, a messaging device, a gaming console, a tablet, a medical device, exercise equipment, a personal digital assistant, or the like.

Referring to FIG. 6, the apparatus 600 may include one or more of the following components: a processing component 602, a storage component 604, a power component 606, a multimedia component 608, an audio component 610, an input/output (I/O) interface 612, a sensor component 614, and a communication component 616.

The processing component 602 may control overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate interactions between the processing component 602 and other components. For instance, the processing component 602 may include a multimedia module to facilitate the interactions between the multimedia component 608 and the processing component 602.

The storage component 604 is configured to store various types of data to support the operations of the apparatus 600. Examples of such data include instructions for any applications or methods operated on the apparatus 600, contact data, phonebook data, messages, pictures, video, etc. The storage component 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 may include a front camera and/or a rear camera. The front camera and the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 may include a microphone ("MIC") configured to receive an external audio signal when the apparatus 600 is in an operation mode, such as a call mode, a recording mode, and a voice recognition mode. The received audio signal may be further stored in the storage component 604 or transmitted via the communication component 616. In some embodiments, the audio component 610 may further include a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 may include one or more sensors to provide status assessments of various aspects of the apparatus 600. For instance, the sensor component 614 may detect an open/closed status of the apparatus 600, relative locationing of components, e.g., the display and the keypad, of the apparatus 600, a change in location of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for imaging applications. In some embodiments, the sensor component 614 may also include an accelerometer sensor, a gyroscope sensor, a magnetic sensor, a pressure sensor, or a temperature sensor.

The communication component 616 is configured to facilitate wired or wireless communications between the apparatus 600 and other devices. The apparatus 600 can access a wireless network based on a communication standard, such as WiFi, 2G or 3G or a combination thereof. In some embodiments, the communication component 616 receives a broadcast signal from an external broadcast management system via a broadcast channel or broadcast associated information. In some embodiments, the communication component 616 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium having instructions stored thereon is provided, such as the storage component 604 with instructions stored thereon. The instructions are executable by the processor 620 in the apparatus 600, for performing the above-described methods. For example, the non-transitory computer-readable storage medium may be a ROM, a RAM, a CD-ROM, a magnetic tape, a floppy disc, an optical data storage device, and the like.

In addition, the instructions stored on the non-transitory computer-readable storage medium, when executed by the processor in the above apparatus 600, may cause the apparatus 600 to perform the above described methods for device identification.

It should be understood by those skilled in the art that the above described modules can each be implemented through hardware, or software, or a combination of hardware and software. Those skilled in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for device identification, comprising:
   obtaining a network class identification for each of multiple different types of network devices, wherein each of the multiple different types of network devices establishes a network, and the network class identification indicates a network coverage location of the network established by each of the multiple different types of network devices;
   determining one or more smart devices within a coverage range corresponding to a network coverage location of each type of network devices, and according to the network class identification of each type of network devices and a device identifier of each of the one or more smart devices within the coverage range, generating a location identification for each of the one or more smart devices within the coverage range, wherein the location identification for each particular smart device of the one or more smart devices within the coverage range is a combination of the network class identification of the network device corresponding to the network coverage location where the particular smart device is located and the device identifier of the particular smart device within the coverage range and indicates a location where the particular smart device is; and
   displaying the location identification for each of the one or more smart devices in a smart device list, wherein the one or more smart devices are grouped according to the network class identification in the smart device list being displayed.

2. The method according to claim 1, wherein prior to the obtaining of the network class identification for each of the multiple different types of network devices, the method further comprises performing at least one of:
   receiving the network class identification which is entered by a user; or
   determining the network class identification according to an instruction for selecting the network coverage location.

3. The method according to claim 1, wherein the network device is one of a router, a repeater, or a switch.

4. An apparatus for device identification, comprising:
   a processor; and
   a memory for storing instructions executable by the processor;
   wherein the processor is configured to:
   obtain a network class identification for each of multiple different types of network devices, wherein each of the multiple different types of network devices establishes a network, and the network class identification indicates a network coverage location of the network established by each of the multiple different types of network devices;
   determine one or more smart devices within a coverage range corresponding to a network coverage location of each type of network devices, and according to the network class identification of each type of network devices and a device identifier of each of the one or more smart devices within the coverage range, generate a location identification for each of the one or more smart devices within the coverage range, wherein the location identification for each particular smart device of the one or more smart devices within the coverage range is a combination of the network class identification of the network device corresponding to the network coverage location where the particular smart device is located and the device identifier of the particular smart device within the coverage range and indicates a location where the particular smart device is; and
   display the location identification for each of the one or more smart devices in a smart device list, wherein the one or more smart devices are grouped according to the network class identification in the smart device list being displayed.

5. The apparatus according to claim 4, wherein the processor is further configured to perform at least one of:
   receiving the network class identification which is entered; or
   determining the network class identification according to an instruction received for selecting the network coverage location.

6. The apparatus according to claim 4, wherein the network device is one of a router, a repeater, or a switch.

7. A non-transitory computer-readable storage medium having stored therein instructions that, when executed by a processor of a terminal device, cause the terminal device to perform a method for device identification, the method comprising:

obtaining a network class identification for each of multiple different types of network devices, wherein the each of the multiple different types of network devices establishes a network, and the network class identification indicates a network coverage location of the network established by the each of the multiple different types of network devices;

determining one or more smart devices within a coverage range corresponding to a network coverage location of each type of network devices, and according to the network class identification of each type of network devices and a device identifier of each of the one or more smart devices within the coverage range, generating a location identification for each of the one or more smart devices within the coverage range, wherein the location identification for each particular smart device of the one or more smart devices within the coverage range is a combination of the network class identification of the network device corresponding to the network coverage location where the particular smart device is located and the device identifier of the particular smart device within the coverage range and indicates a location where the particular smart device is; and displaying the location identification for each of the one or more smart devices in a smart device list, wherein the one or more smart devices are grouped according to the network class identification in the smart device list being displayed.

8. The non-transitory computer-readable storage medium according to claim 7, wherein prior to the obtaining of the network class identification, the method further comprises at least one of:

receiving the network class identification which is entered; or determining the network class identification according to an instruction for selecting the network coverage location.

9. The non-transitory computer-readable storage medium according to claim 7, wherein the network device is one of a router, a repeater, or a switch.

* * * * *